United States Patent [19]

Ritola

[11] Patent Number: 4,801,233
[45] Date of Patent: Jan. 31, 1989

[54] STICKER PLACER APPARATUS

[75] Inventor: Edward Ritola, La Center, Wash.

[73] Assignee: Harvey Industries, Inc., Little Rock, Ark.

[21] Appl. No.: 83,455

[22] Filed: Aug. 10, 1987

[51] Int. Cl.$^4$ .............................................. B65G 57/26
[52] U.S. Cl. .................................. 414/789.5; 221/94; 221/298; 414/276; 414/792.7; 414/794
[58] Field of Search ...................... 414/42, 69, 80, 276; 221/93, 94, 243, 285, 298

[56] References Cited

U.S. PATENT DOCUMENTS

| | | | |
|---|---|---|---|
| 674,262 | 5/1901 | Duncan et al. | 414/42 X |
| 1,283,871 | 11/1918 | Nichols | 414/42 |
| 1,880,077 | 9/1932 | Dill et al. | 414/80 X |
| 2,838,188 | 6/1958 | Mason | 221/94 X |
| 3,081,888 | 3/1963 | Lawson | 414/42 X |
| 3,361,272 | 1/1968 | Carroll | 414/276 X |
| 3,643,621 | 2/1972 | Newnes | 414/42 X |
| 3,738,510 | 6/1973 | Mason | 414/42 X |
| 3,873,000 | 3/1975 | Eaton et al. | 414/42 X |
| 3,904,044 | 9/1975 | Lunden | 414/42 X |
| 3,968,886 | 7/1976 | Leon | 414/42 |
| 4,090,618 | 5/1978 | Lehmann | 414/42 X |
| 4,144,976 | 3/1979 | Rysti | 414/42 |
| 4,195,737 | 4/1980 | Rysti | 414/41 X |
| 4,264,253 | 4/1981 | Kennison | 414/42 |
| 4,360,303 | 11/1982 | Rysti | 414/42 |

FOREIGN PATENT DOCUMENTS 143092  5/1985  European Pat. Off. .............. 414/42
730565  4/1980  U.S.S.R. ................................ 414/42

Primary Examiner—Leslie J. Paperner
Attorney, Agent, or Firm—Kolisch, Hartwell & Dickinson

[57] ABSTRACT

Improved sticker placer apparatus is described. The apparatus includes plural, inclined sticker feed pockets for holding stickers simultaneously to be placed and vertically reciprocable placement arms, each being capable of displacing one sticker at a time from the mouth of the sticker pocket to a variable height of lumber indexed therebeneath, and each having a positive sticker capture device including a generally horizontal pivotable support arm for cradling the sticker thereabove, and a downwardly impinging pincer arm for urging the sticker downwardly throughout the placement cycle. Each placement arm further has plural stops for halting the descent of the arm when the top of the lumber is reached, a slider link mechanism providing dwell time between the arm's downstroke and upstroke and a spring-tensioned rocker arm operable during the dwell time to pivot the support arm out from under the sticker when the associated stops are reached. The individual slider link mechanisms selectably are extended and retracted by a single, common drive cylinder to reciprocate the associated placement arms. Upstream stickers are retained by spring-tensioned pinch bars impinging on the face of the to-be-placed sticker. Fully automatic, continuous operation of the apparatus is enabled by selectively openable and closeable feed gates located at the top of each feed pocket.

21 Claims, 5 Drawing Sheets

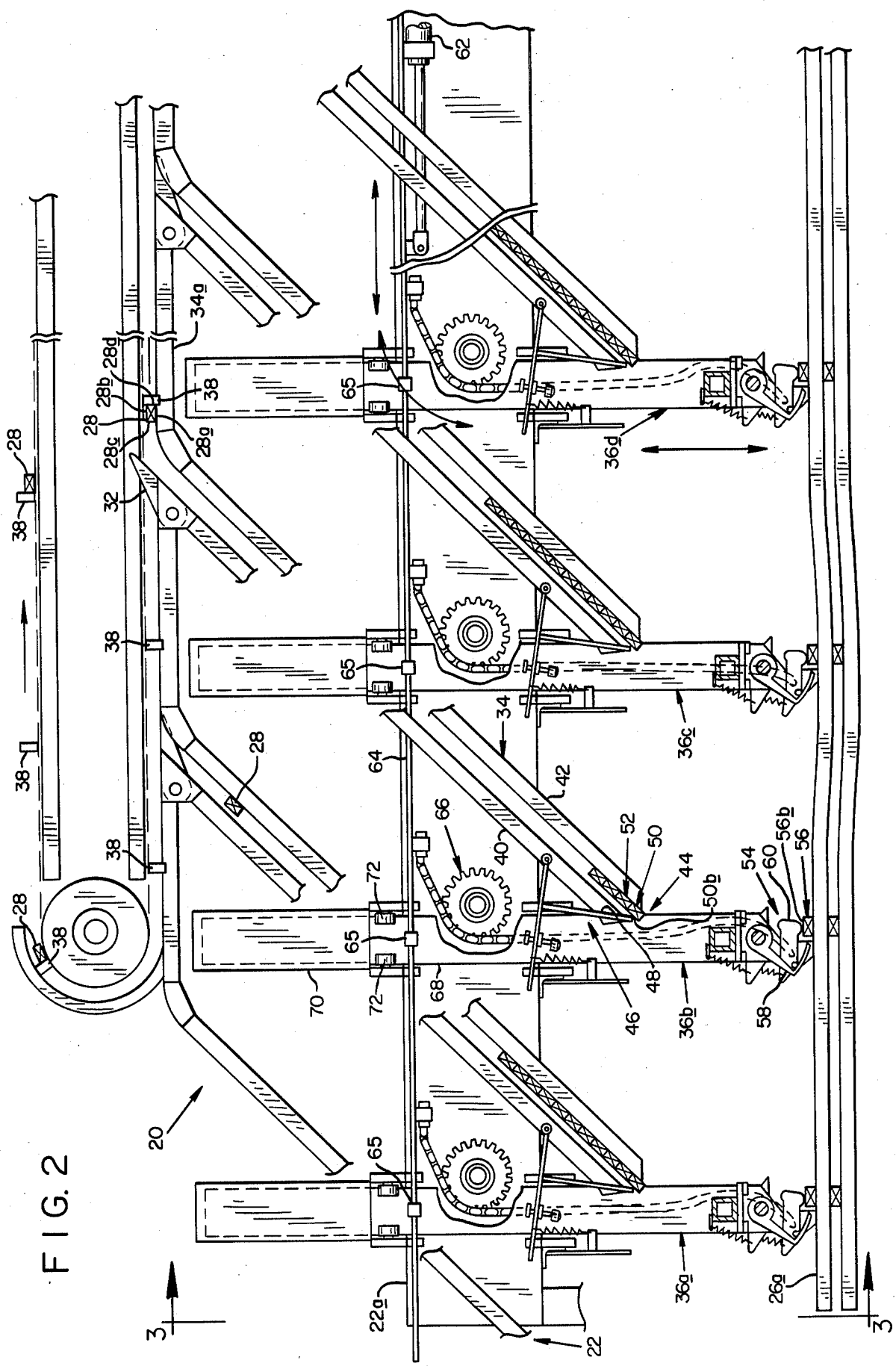

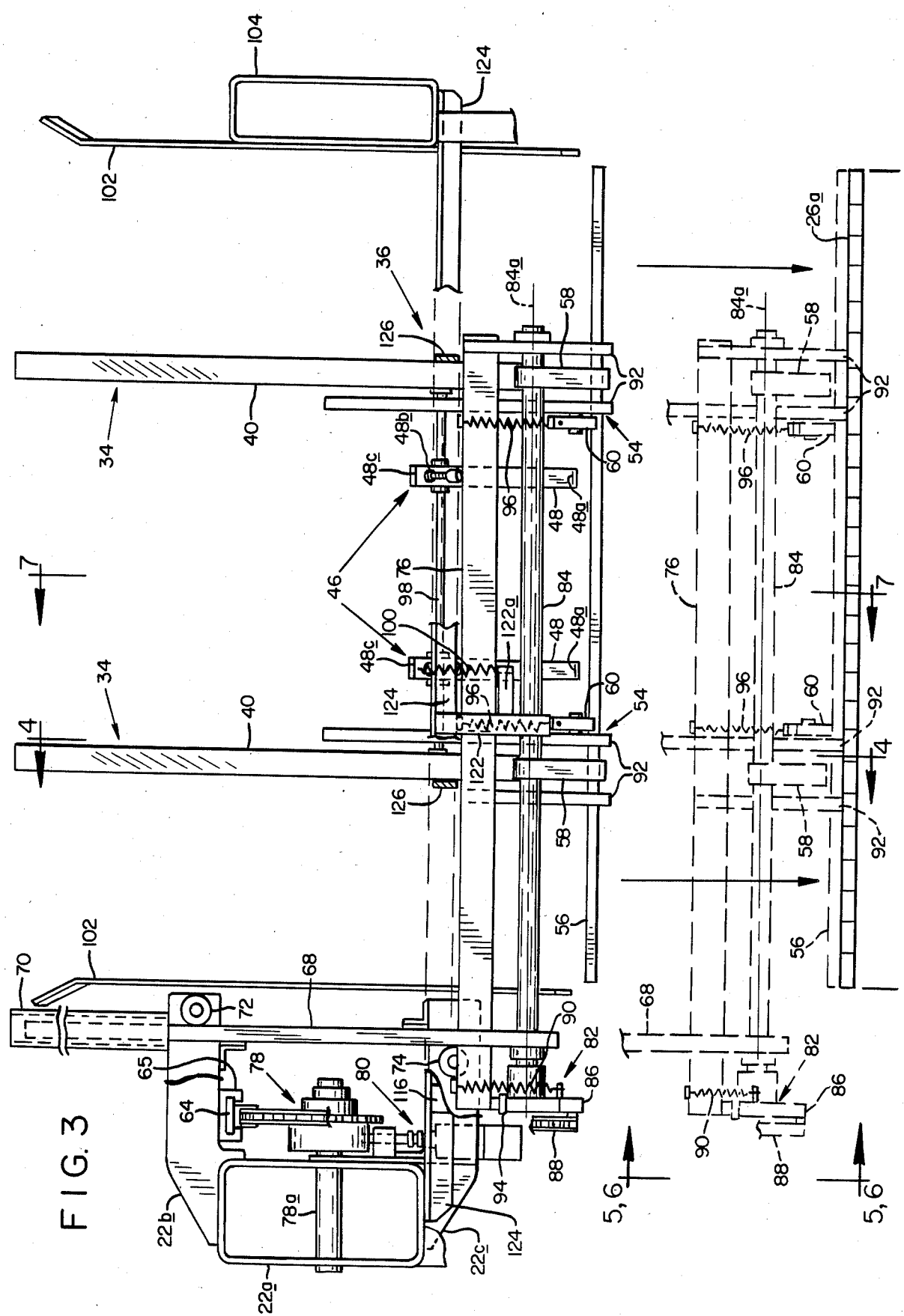

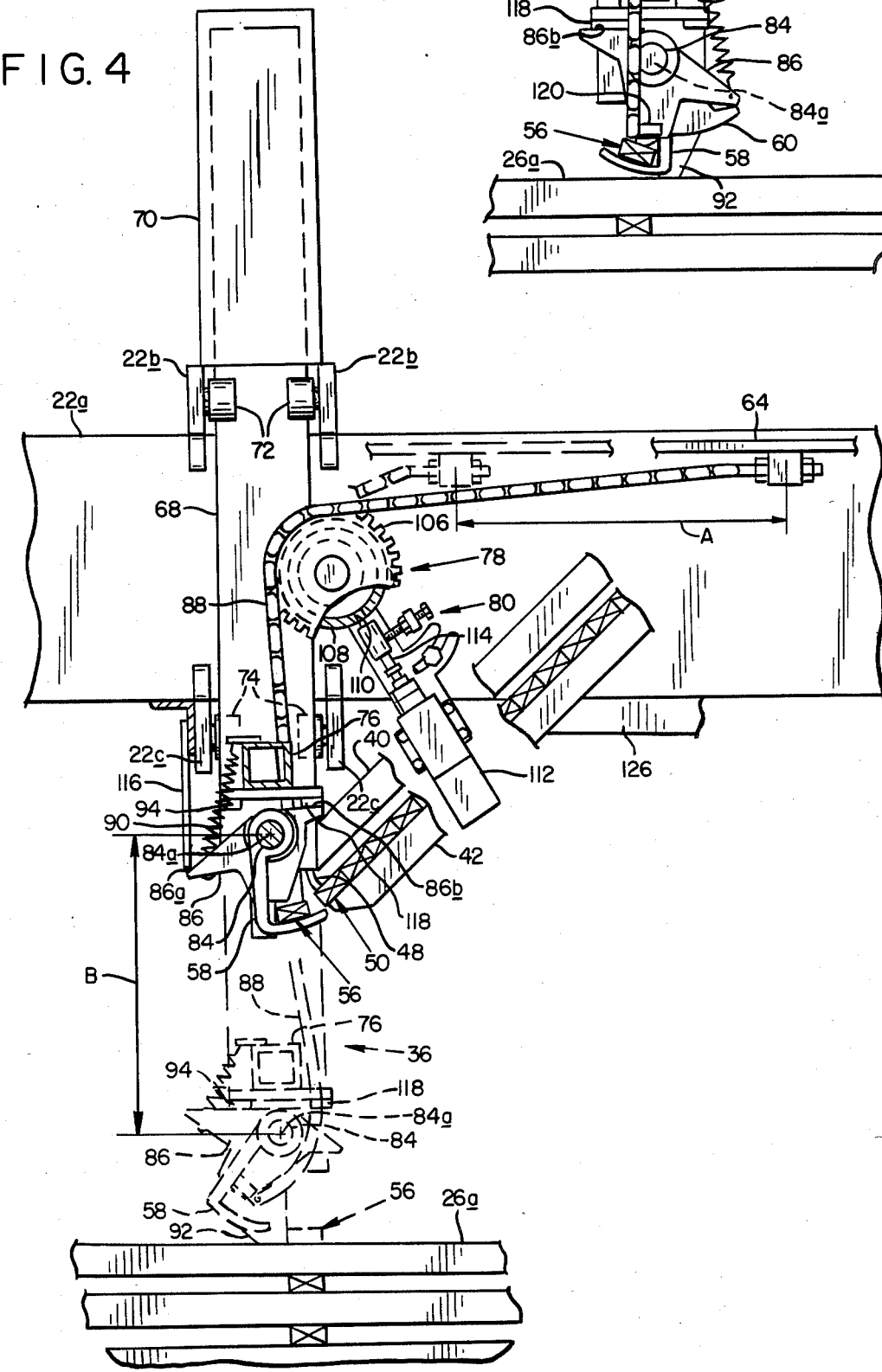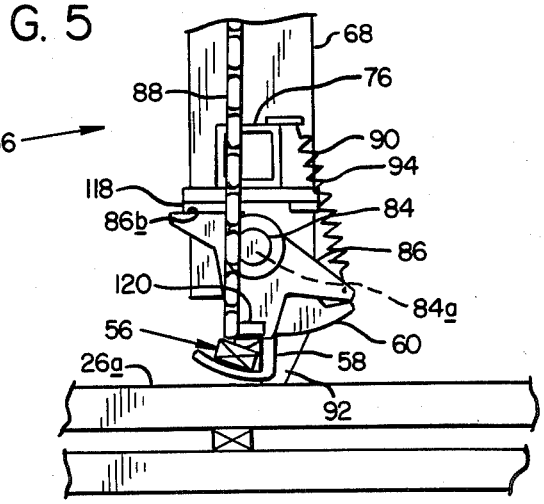

STICKER PLACER APPARATUS

BACKGROUND AND SUMMARY OF THE INVENTION

This invention relates generally to sticker placer apparatus. More particularly, this invention concerns improved apparatus providing inclined sticker feed pockets, positive sticker capture throughout placement, and a drive linkage that permits each placement arm in a system to 'seek' the level of the top of the course of lumber. The combined features of the invention provide sticker placer apparatus achieving accurate placement and high throughput in virtually jam-proof, fully automatic operation.

Sticker placer apparatus are used to place stickers between stacked courses of fresh-cut lumber. The sticker serves the purpose of stabilizing the stacked lumber and permitting airflow between courses while the lumber cures. Typically, sticker placer apparatus are used in conjunction with lumber stacking equipment, wherein the lumber stacker develops a course of lumber and then the sticker placer places stickers transversely therealong above which the lumber stacker develops another course, etc. The number of sticker placement positions within a sticker placer is dependent upon the maximum course length and required spacing between stickers. Most multistation sticker placers operate the various positions simultaneously, wherein a number of stickers are placed in spaced apart relationship with one another along the length of the course of lumber.

A number of problems attend the use of conventional sticker placer apparatus. Most have to do with the imperfections frequently found in the stickers themselves, which are manufactured cheaply and are continuously recycled. With normal use, stickers tend to bow, twist, crook, wear and flatten as a result of being pressed between courses of lumber of varying thickness, and as a result of handling and weathering. In some cases, the thinnest sticker approaches half the thickness of the thickest sticker. Stickers also may be oversized in thickness from improper manufacture, or may be of varying surface conditions from improper screening or grading.

Conventional sticker placer apparatus store stickers in sticker feed pockets, or magazines, one atop the other with the greater cross-sectional dimension oriented horizontally. In order to eject or release the bottom sticker in a feed pocket, conventional placers either pinch the edge of the second sticker from the bottom of the pocket, while permitting the bottom sticker to drop free, or provide a throat, in the side of the pocket's base, large enough for a single sticker to be ejected sideways through, yet small enough to prevent the ejection of more than one.

The former type of sticker placer, commonly known as a pinching sticker placer, suffers the drawback that the second sticker from the bottom precisely must be located and shaped in the area of the pinching mechanism to prevent its falling. Thus, if the second sticker is too high or too low because the bottom sticker is too thick, too thin, twisted or bowed, the pinching mechanism cannot pinch it properly and keep it from falling. Similarly, if the edge of the second sticker is not both planar and vertical in the area of the pinching mechanism, the mechanism may be incapable of preventing its falling.

The latter type of sticker placer, commonly known as a side ejection sticker placer, easily may jam when two thin stickers find their way to the bottom of the feed pocket and both attempt to pass simultaneously through the opening. Similarly, if the bottom sticker is oversized in thickness or twisted or bowed, it may not pass through the opening. Finally, the surface condition of one or both of the bottom stickers in the feed pocket may prevent their sliding smoothly across one another, resulting thereby in a jammed sticker placer.

Other problems arise when a conventional sticker placer is used with courses of lumber that, when stacked, are uneven (nonplanar) or unlevel. Typically, a multi-station sticker placer positively links together the reciprocating motion of its placement arms. All arms descend for a predetermined period of time or until the earliest stop is reached, and then all arms simultaneously halt their descent, regardless of whether all arms have reached the level of the top of the course of lumber. As all stickers then are released simultaneously, some therefore are not controllably placed, but rather are dropped onto the course of lumber. Furthermore, if one arm of a multi-position sticker placer should jam, none is allowed to operate, because the movement of the common link mechanism is stopped. Similar problems arise with those side ejection sticker placers that eject stickers from multiple positions simultaneously through a positive link drive. Once again, if an individual sticker ejector jams, the movement of the common link is stopped, and none of the stickers is ejected.

It is desirable to provide an improved sticker placer that overcomes the problems described above. Specifically, the sticker placer should be highly tolerant of the inevitable sticker misfits, and should be virtually jam-proof. Such a sticker placer would be capable of fully automatic, repeatably accurate and rapid placement of multiple stickers atop consecutive courses of lumber, which may be not precisely level or planar. The improved sticker placer should operate reliably under extreme environmental conditions of dust and humidity.

Accordingly, it is a principal object of the present invention to provide a multi-position sticker placer having significantly improved placement accuracy, throughput and reliability.

Another object of the invention is to provide such apparatus that is compatible with automatic loading of the sticker feed pockets.

Yet another object of the present invention is to provide a sticker placer that optimizes the path traversed by a sticker between horizontal conveyance and vertical placement.

A further object of the invention is to provide a virtually jam-proof, multi-position sticker placer.

Still another object of the invention is to provide such apparatus with a minimum number of drive mechanisms.

Another important object is to provide multi-position apparatus that permits the selective disabling of individual The apparatus of the present invention takes the form of a stationary, frame-mounted apparatus including multiple, gravity-fed inclined sticker feed pockets, each of which feeds edge-abutted stickers to a vertically reciprocable placement arm. Selectively, each placement arm alternately may be lowered and raised by a slider link, or roller chain, that adjustably is extended and retracted by a single, hydraulic or pneumatic cylinder common to all arms. It will be understood that slider link, as used herein, describes the fact that the link is permitted to slip, or disengage individual arms from the common drive cylinder during the extension thereof, thus distinguishing positive links that rigidly connect members for one-to-one movement therebetween.

Each placement arm is equipped with dual, positive sticker capture means including a pivotable, generally horizontal cradle and releasable sticker retaining means, which impinge, throughout the placement cycle, on the sticker's upper face. Plural stops halt each arm's descent when the top of the lumber course is reached thereby, causing the roller chain to slacken until fully extended. The resulting lost motion beneficially provides a dwell time during which a spring tensioned rocker arm, to which the roller chain is attached, may pivot the support arm out from under the sticker. During this dwell time, the sticker retaining means continues to urge the sticker downwardly, thus accurately and securely positioning it atop the course of lumber. Pivoting of the rocker arm, made possible by the slackening of the roller chain when at least one of the placement arm's stops reaches the top of the lumber course, also positions the roller chain on the opposite side of the rocker arm's pivotal axis so that, upon retraction of the roller chain, the support arm is maintained in its pivoted, sticker releasing position as the placement arm is raised and the placement cycle is completed.

The to-be-placed sticker immediately upstream from the sticker being placed is retained, throughout the placement cycle just described, by an adjustable, spring tensioned pinch bar that impinges upon the to-be-placed sticker's upper face until the placement arm completes its upstroke. Thus, by the orientation of the stickers in edge, rather than face abutment, and by the positive retention of upstream stickers within the feed pocket, stickers smoothly, controllably advance toward the placement arm.

Feed gates are provided adjacent the top of each feed pocket. Controlled opening and closing of the feed gates and the use of a conventional conveyor, preferably loading chains, provide uninterrupted, fully automatic operation of the sticker placer apparatus.

Thus, the objects of the invention are realized. Stickers are handled within the inclined feed pocket in edge-to-edge, rather than face-to-face, orientation, which renders them more controllable despite surface irregularities, over- or under-sizing, bowing, twisting or crooking. By the positive capture of each sticker by its opposing faces, rather than opposing edges, placement accuracy is greatly improved. Inherently unreliable timing circuits and limit switches are avoided by the use of placement arm-mounted stops, spring tensioned rotation and a slider link, which provide dwell time between the down- and up-strokes for the time-critical release of the sticker. Lost motion provided by the stops, the variable tension slider link and the common drive cylinder enable each placement arm to 'float' to the level of the lumber at its position along the length of the lumber course, and permit other placement arms to continue to operate in the event one or more jams. A selectively operable feed gate at the top of each feed pocket provides an uninterrupted supply of stickers, based upon the demand at each placement position, for the fully automatic operation of the sticker placer.

These and other objects and advantages of the invention will become more fully apparent when the detailed description below is read with reference to the accompanying drawings.

BRIEF DESCRIPTION OF THE DRAWINGS

FIG. 2 is a fragmentary, side elevation of the placer apparatus.

FIG. 3 is a front elevation showing one of the placer's placement carriages in a raised position (solid lines), and in a lowered position (dashed lines).

FIG. 4 is an enlarged, fragmentary, cross-sectional view taken generally along the lines 4—4 in FIG. 3.

FIG. 5 is an enlarged, fragmentary, side elevation taken generally along the lines 5—5 in FIG. 3, showing a placement arm in its lowered, sticker capture position.

FIG. 6 is an enlarged, fragmentary, cross-sectional view similar to FIG. 5, but showing the placement arm in its sticker release FIG. 7 is an enlarged, fragmentary, side elevation taken generally along the lines 7—7 in FIG. 3.

DETAILED DESCRIPTION OF THE PREFERRED EMBODIMENT

Figure 1:
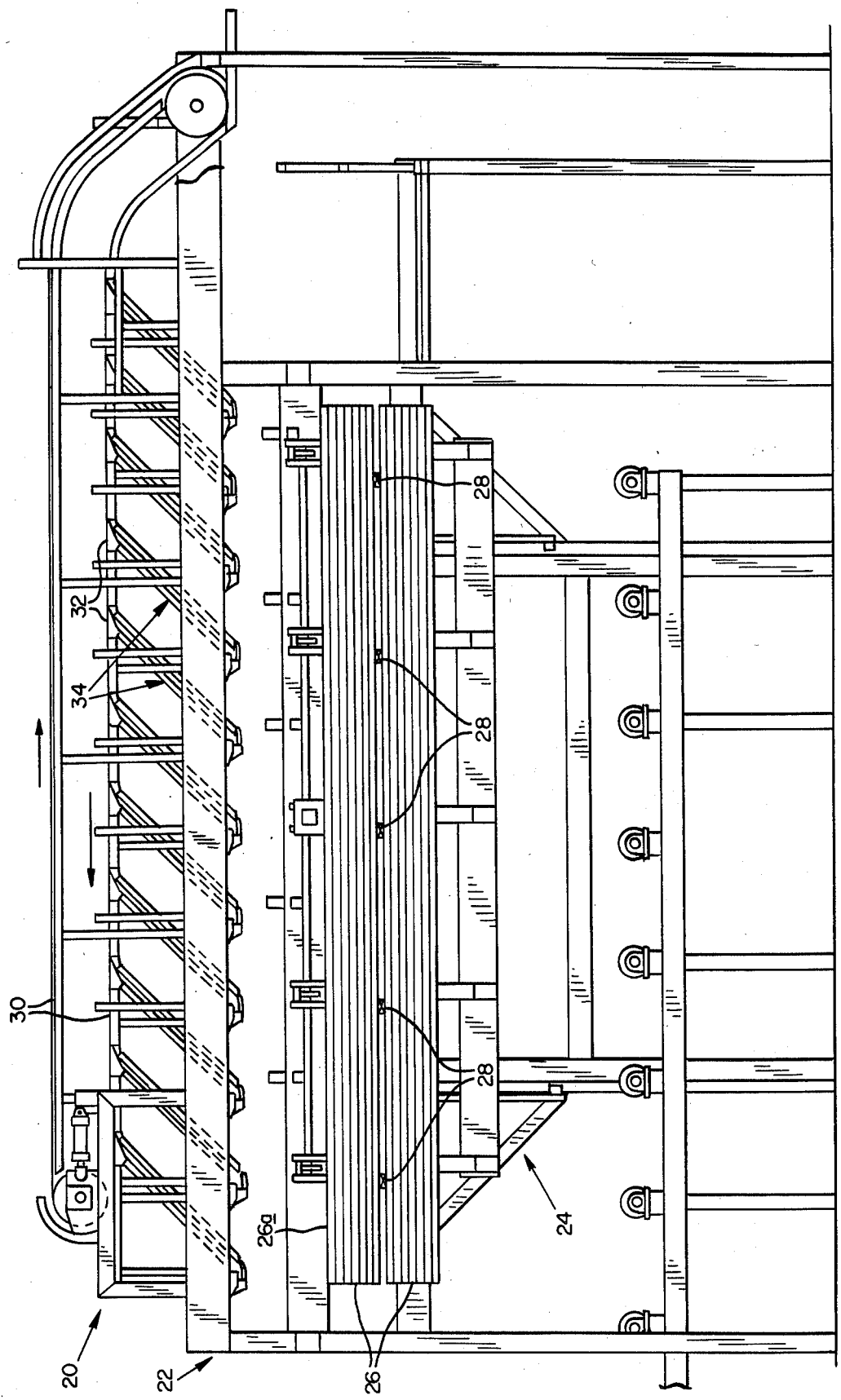
FIG. 1 is a side elevation of a sticker placer apparatus made in accordance with the invention, showing its use with conventional lumber stacking/indexing equipment.

FIG. 1 may be thought of as a general system diagram, showing, in side elevation, the sticker placer of the present invention, indicated generally at 20, mounted on stationary frame 22 above conventional lumber stacker equipment, indicated generally at 24. Lumber courses 26 are generally horizontally supported by lumber stacker 24 and it is understood by those skilled in the art that, as each new course of lumber is developed for stacking thereabove, stacker 24 indexes, or advances, downwardly in order to maintain an approximately consistent height of the top 26a of the lumber course on which the next array of stickers, such as stickers 28, may be placed. Stickers 28 are placed by sticker placer 20 at predetermined, longitudinally spaced apart positions along top lumber course 26, and are oriented generally transverse thereto.

Referring still to FIG. 1, sticker placer apparatus 20 includes, in the preferred embodiment, continuous-loop, horizontal conveyor means or loading chains 30, having feed dogs (not shown in FIG. 1, but shown in FIG. 2 at 38) spaced therealong. By advancing in the direction indicated by the arrows, conveyor means 30 ensures a continuous supply of stickers for placement at selective positions along the top 26a of the course of lumber. Independently, selectively operable feed gates, such as gates 32, may be driven open to receive into sticker receiving means, or a corresponding magazine, or sticker feed pocket, such as pocket 34, stickers as they otherwise endlessly traverse conveyor means 30. A full supply of stickers may thus be maintained in each of the pockets 34.

Turning now to FIG. 2, sticker placer 20 is shown in an enlarged, fragmentary side elevation, and will be described in the sequence of its normal operation. A feed dog 38 connected to conveyor 30 urges a sticker 28 toward open feed gate 32. Sticker 28, generally having opposite faces 28a, 28b and opposite edges 28c, 28d, is shown in end view as it slides generally longitudinally horizontally along a horizontal stretch 34a of feed pocket 34. With feed gate 32 open, sticker pocket 34 will receive sticker 28 between parallel, spaced apart upper rail 40 and lower rail 42. Sticker 28 will slide on its lower face 28a, under the force of gravity, along lower rail 42 towards the mouth 44 of pocket 34. In the illustration of FIG. 2, sticker 28 will become the sticker furthest upstream in pocket 34, i.e. the sticker furthest from mouth 44 and closest to feed gate 32. Ultimately, sticker 28 will come to rest against a downstream sticker, with leading edge 28c engaging the trailing edge of that sticker within pocket 34. Each pocket 34 consists of a pair of laterally spaced apart rails 40, 42. For each pocket 34 shown in FIG. 2, there may be one or more provided aligned therewith in a direction extending transversely of the apparatus as seen in FIG. 3.

Importantly, pocket 34 is inclined, at an angle preferably between 30° and 60°, and most preferably at an angle of approximately 45°, relative to conveyor means 30, and rails 42 are made of smoothly finished, tubular steel, thereby promoting the smooth sliding of stickers generally longitudinally horizontally down the incline and transverse thereto. A substantial advantage is obtained thereby, as a sticker, such as 28, need not change direction as abruptly as it might were pocket 34 generally vertically oriented, as is customary.

It is equally important that stickers, such as 28, within pocket 34 are edge-stacked, rather than being stacked face-to-face. By their novel arrangement within pocket 34, the inherent tendency of the stickers to bow or twist least impacts the ability of pocket 34 to maintain their consistent, stacked orientation. The handling of stickers by their faces, throughout conveyance, stacking and placement, renders sticker placer 20 substantially more tolerant of inherent sticker imperfections, as sticker faces typically are more regular than sticker edges.

Finally, it is important to note that the distance between upper and lower rails 40, 42 (in a direction perpendicular thereto) is dimensioned to be substantially greater than the nominal, predetermined thickness of the stickers which will pass therebetween. This cooperative arrangement of rails 40, 42 ensures the controlled, gravity-fed, sliding advancement of stickers, such as 28, toward mouth 44 for placement, despite the frequently oversized or twisted condition of recycled stickers.

Referring still to FIG. 2, it will be seen that associated with mouth 44 of pocket 34, and operable with placement arm 36, is releasable sticker retention means, or a pinch bar mechanism, indicated generally at 46. Pinch bar mechanism 46 includes a pinch bar 48, shown impinging upon the upper face 50b of to-be-placed sticker 50. In a manner that will be described, pinch bar 8 so impinges under spring tension throughout the downstroke of placement arm 36b and through most of the upstroke thereof, with pinch bar 48 being lifted at the end of the upstroke to release to-be-placed sticker 50 for placement. It may be seen that to-be-placed sticker 50, thus retained at mouth 44 of pocket 34, prevents the further downward sliding of upstream stickers, such as sticker 52, by the edge-lengthwise abutment therebetween.

Positive sticker capture means, or a sticker capture mechanism, is indicated generally at 54. In the preferred embodiment, a sticker-being-placed 56 is cradled, during the downstroke of placement arm 36b, above dual, laterally spaced apart, generally horizontal, pivotable support arms 58, of which one is shown in FIG. 2 in its sticker release position (the other arm transversely aligned with the arm 58 shown in FIG. 2 appears in FIG. 3). With placement arm 36b in the lowered position, as illustrated in FIG. 2, sticker-being-placed 56 is urged downwardly onto the top 26a of the course of lumber by impingement upon its upper face 56b of dual, corresponding, laterally spaced apart, pivotable pincer arms, such as pincer arm 60. A support arm 58 and its cooperating pincer arm 60 make up what is referred to herein as a capture means or mechanism 54. Sticker 56 controllably and generally vertically may be displaced from mouth 44 of pocket 34 to the top 26a of lumber course 26 by capture mechanism 54, rather than prematurely being released or dropped. Although the preferred embodiment is seen to include dual, symmetric sticker capture mechanisms, it will be appreciated that, within the spirit of the invention, sticker capture means 54 may comprise a single, pivotable support arm and a corresponding releasable sticker retainer capable of urging the sticker into captured engagement therewith.

Importantly, each individual placement arm such as arms 36a, 36b, 36c, may, by the novel slider link mechanism to be described below, 'seek', or 'float to', the level of the top 26a of the course of lumber at their individual positions therealong. Even if the lumber course is unlevel or of variable height as it extends longitudinally beneath sticker placer 20, nevertheless all stickers placed thereby during a placement cycle will be placed positively at the various levels along lumber course 26. This improved operation is illustrated in FIG. 2, wherein arm 36c has reached a lower position of the lumber therebeneath than have arms 36a, 36b, 36d, which are positioned at their higher, respective lumber heights. This represents a substantial improvement over previously state-of-the-art apparatus, in which positive link means connecting adjacent placement arms permit the downstroke of any given placement arm to terminate—prematurely, in the event that the arm is positioned over a slightly depressed length of lumber—at a predetermined time after the downstroke begins, or at a predetermined height where the reciprocal reach of the drive mechanism is exhausted.

The novel slider link mechanism of the present invention serves another important purpose: dwell time is provided between the downstroke and the upstroke of each placement cycle, during which time support arm 58 may be pivoted from a first, sticker supporting position to a second, sticker release position.

The advantages described immediately above are provided by sticker displacing means that includes slider link extending and retracting means that, in the preferred embodiment, takes the form of a single, common, reciprocable drive cylinder 62 that is positively, or strongly, reciprocally linked to a horizontal actuator 64. Actuator 64 is weakly linked, in turn, to a variable tension link mechanism, indicated generally at 66. Link mechanism 66 transforms the generally horizontal, reciprocal motion of actuator 64 within channels 65 into the generally vertical, reciprocal motion of placement arm 36 and a range of lost motion sufficient to provide the important dwell time associated with capture mechanism 54.

FIG. 3 is a front elevation corresponding to FIG. 2, in which the laterally spaced apart features of sticker placer 20 are illustrated. within bar guard 70. Carriage bar 68 of a placement arm means 36 is vertically reciprocatable It is guided along its generally vertical path by an upper and lower pair of cam followers 72, 74, which are rotatably mounted on needle bearings adjacent the ends of vertically spaced apart mounts 22b, 22c extending laterally inwardly from, and above and below, a horizontal, tubular working beam 22a. Rigidly mounted to carriage bar 68, at a height below cam follower pair 72, is a transverse support member 76, which, in turn, mounts dual sticker capture mechanisms 54.

A sprocket assembly, indicated generally at 78, is rotatably, ball bearing mounted on a shaft 78a that extends transversely across Working beam 22a in a location that may be thought of as upstream from placement arm 36. Cooperable with sprocket assembly 78 is a pocket lockout mechanism 80, which is capable of selectively preventing the rotation of sprocket assembly 78. Sprocket assembly 78 and lockout mechanism 80, which will be described in detail in reference to FIG. 4, advantageously permit the selective disassociation of one or more placement arms, such as arm 36, from single, common drive cylinder 62 (not shown in FIG. 3).

Figures 6, 7:
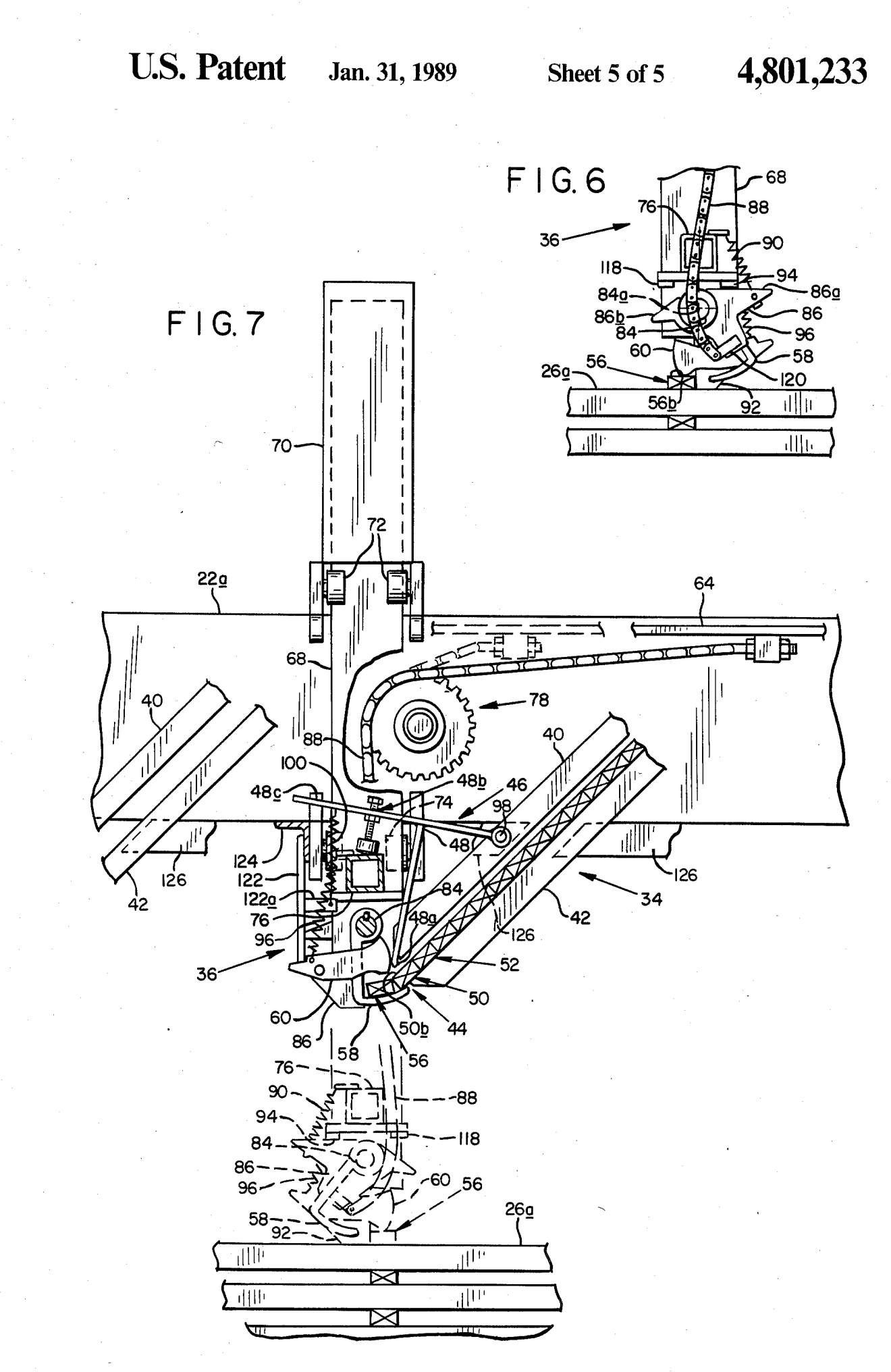

Lost motion means are provided by a rocker assembly 82, including a rocker arm 86 pivots with a ball bearing mounted, rotation of, carriage shaft 84 to which arm 86 is joined. Rocker, assembly 82, on rotation of shaft 84 and by reason of support arms 58 being joined to the shaft, is operable to pivot support arms 58. Rocker arm assembly 82 further includes a slider link, or roller chain, 88 eccentrically attached to arm 86 in a manner to be described; and a coil spring 90, also eccentrically attached to rocker arm 86 but in a position arcuately spaced apart from the attachment of roller chain 88. FIGS. 5 and 6 best illustrate these attachments to rocker arm 86. The tendency of roller chain 88, normally tensioned by the weight of placement arm 36, is to urge shaft 84, and, thereby, support arms 58, into a first, sticker supporting position beneath sticker 56 (shown in solid outline in FIG. 4). As may be seen by brief reference to FIG. 4, roller chain 88 pivotally connects to rocker arm 86 and extends therefrom generally upwardly to semicircumferentially engage sprocket assembly 78 and then longitudinally in the general direction of feed pocket 34, where it adjustably, pivotally connects to actuator 64.

It will be understood that when actuator 64 is extended, slidably within channels, such as channel 65, by common drive cylinder 62, roller chain 88 controllably permits the descent, under the force of gravity, of placement arm 36, which is cantilevered via carriage bar 68 between upper and lower cam follower pairs 72, 74. When at least one of plural, spaced apart stops 92 appropriately joined to bar 76 engages the top 26a of the course of lumber, as shown in FIGS. 4 and 5, the tension in roller chain 88 diminishes as cylinder 62 further extends actuator 64. With roller chain 88 in a reduced tension condition, sticker release means, or a coil spring 90 pivots rocker arm 86, urges support arms 58 out from under sticker 56 and positions the distal end of roller chain 88 on the opposite side of central axis 84a of shaft 84. This pivotal movement occurs during what is referred to herein as dwell time, and its important consequences are best shown in FIGS. 4 and 6 in which it may be seen that roller chain 88 has slackened in response to the further extension of actuator 64 by drive cylinder 62. By the time actuator 64 is fully extended (at the end of the dwell time), rocker arm 86 has reached its second, sticker release position against rocker arm stop 94 (shown in dashed outline in FIG. 4). When actuator 64 alternately is retracted, during the upstroke of the placement cycle, the tension in roller chain 88 is restored, and roller chain 88 raises placement arm 36, while maintaining rocker arm 86 in its sticker release position.

Pincer arm 60, which impinges upon the upper face 56b of sticker 56 throughout the downstroke and dwell time of placement arm 36 is pivotally urged into its sticker capture position by a coil spring 96. By impinging upon a face, rather than an edge, of the sticker being placed, pincer arm 60 ensures the positive capture of the sticker throughout placement, despite the fact that the sticker may have flattened, twisted or bowed with use, or may have out-of-square, or rounded or otherwise damaged edges. In cooperation with each horizontal support arm 58, a corresponding pincer arm 60 ensures that the sticker being placed is securely captured in a generally horizontal orientation for accurate placement.

Overcoming the disadvantages of conventional apparatus, the sticker capture mechanism of the present invention permits faster placement of stickers by urging the sticker downwardly from the time it is received onto support arm 58 until it stably reclines on the top 26a of the course of lumber, rather than relying on the sticker's weight somehow to land it on top of the lumber. By the use of dual, laterally spaced apart sticker capture mechanisms that grasp one sticker at a time at lengthwise symmetric locations inset from the end thereof, the longitudinal orientation of the sticker in generally perpendicular relation to the lengthwise orientation of the lumber is assured.

Referring still to FIG. 3, it may be seen that pinch bar mechanism 46 consists of dual, laterally spaced apart pinch bars 48 rotatably, sleeve bearing mounted to (e.g. using plastic bushings), and extending radially from, fixed pinch bar shaft 98, which extends between upper rails 40 as shown. Pinch bars 48 normally are urged by coil springs 100 into a position for impinging upon to-be-placed sticker 50, as will be described in reference to FIG. 7. It will be understood that pinch bars 48 are positioned to impinge upon to-be-placed sticker 50 (as shown in FIG. 2) in such manner that to-be-placed sticker 50 and stickers upstream therefrom are retained within feed pocket 34 in a substantially longitudinally horizontal position generally parallel to shaft 84.

Dual sticker fences 102 (FIG. 3), which are laterally spaced apart at a distance somewhat greater than the predetermined nominal maximum length of the stickers, assist in guiding the stickers as they advance downstream within sticker pocket 34. Fences 102 are flanged near the upstream end of pocket 34, to accommodate a range of lateral positions of stickers on conveyor means 30. Located generally laterally opposite working beam 22a, and supporting one of the sticker fences 102, is a horizontal, tubular support beam 104. Support beam 104 may be made of somewhat lighter gauge material than that used in working beam 22a, as beam 104 is not subjected to the torsional stress felt by beam 22a. It now will be understood that, although shown in FIG. 3, support beam 104 is not shown in FIG. 2, for the sake of clarity.

Focusing briefly on the dashed outlines in FIGS. 3 and 4, placement arm 36 is shown in a lowered position, wherein plural stops 92 engage the top 26a of the course of lumber; wherein horizontal support arms 58 have been pivoted, under the action of coil springs 90, into their second, sticker release positions; and wherein pincer arms 60 continue to urge, under the action of coil springs 96, sticker 56 downwardly onto the top 26a of the top lumber course (refer to FIG. 3). It will be seen that pinch bars 48 are pivoted, at the urging of coil springs 100, to impinge upon to-be-placed sticker 50, thereby retaining it and upstream stickers, such as sticker 52, within feed pocket 34. Rocker arm 86 has pivoted into its sticker release position against rocker arm stop 94, and roller chain 88 has, by this pivoting action, repositioned itself in front of (in FIG. 4, to the left of) central axis 84a of rotary shaft 84. This pivotal action and the repositioning of roller chain 88 best are illustrated in FIGS. 5 and 6.

Referring now to FIG. 4, the structure and operation of pocket lockout mechanism 80, and certain other details of the preferred embodiment, will be described. Sprocket assembly 78 includes a sprocket 106 having teeth spaced circumferentially therearound at intervals nominally equal to the spacing between the rollers (not shown) of roller chain 88, and a rigidly mounted lockout ring 108 having a hole 110 bored through an annular region thereof. The sprocket and lockout ring subassembly preferably are ball bearing mounted to rotate on a fixed shaft 78a extending transversely through working member 22a. A lockout cylinder 112 associated with each placement arm, such as arm 36, selectively may be actuated to extend a plunger 114 through hole 110 to prevent the rotation of sprocket 106. In operation, the lockout mechanism prevents the descent of placement arm 36 by disassociating, or disengaging, arm 36 from actuator 64, which is horizontally reciprocated by common drive cylinder 62. Other placement arms, such as arm 36, are permitted to operate normally, while roller chain 88 associated with the locked out placement arm 36 is allowed to slacken and drape between its adjustable attachment to actuator 64 and its toothed sprocket 106. The motion of actuator 64 thereby intentionally and beneficially is lost on the selected, locked-out placement arm, and no sticker is placed in the position corresponding thereto.

Another important advantage of the novel slider link mechanism of the present invention will be apparent to those skilled in the art. In the event that certain of the placement arms within the array extending longitudinally above the course of lumber should become jammed, others may continue to operate normally. Assume, for example, that no lockout mechanism, such as mechanism 80, is active and that a grossly oversized sticker, e.g. one whose cross-sectional dimensions are 1"×4", rather than a predetermined nominal 1"×2", accidentally is placed on conveyor 30 and finds its way into pocket 34. It is likely, under this scenario, that such a sticker will jam placement arm 36 as the sticker only partially exits mouth 44 and partially rests on support arm 58. As actuator 64 is extended to permit the descent of all placement arms 36, nevertheless, by virtue of link mechanism 66, roller chain 88 of the affected placement arm will develop slack between sprocket 106 and its attachment to rocker arm 86. Thus, although the affected placement arm will remain jammed until the oversized sticker is cleared, other placement arms will continue to operate, without damage to the oversized sticker or to the placement apparatus itself.

Returning to the normal operation of placer 20, when placement arm 36 reaches the top of its upstroke, planar surface 86a of rocker arm 86 strikes trip 116 and urges rocker arm 86 into its first, sticker supporting position against a second rocker arm stop 118. By this pivotal movement, roller chain 88 is positioned behind (in FIG. 4, to the right of) central axis 84a of shaft 84 and tensions spring 90, thus preparing placement arm 36 to receive to-be-placed sticker 50 for the placement thereof during the next downstroke.

Referring still to FIG. 4, it will be appreciated that the length of roller chain 88, relative to the extent A to which actuator 64 horizontally reciprocates, determines the range of heights of lumber course 26 that may be reached by placement arm 36. Similarly, the length of roller chain 88 determines the amount of dwell time provided for the pivotable movement of rocker arm 86 and support arms 58. If dimension B represents the minimum nominal stroke of placement arm 36, then the length of roller chain 88 must be dimensioned such that B is less than A. This relationship ensures that when stops 92 engage the top 26a of the course of lumber, there remains sufficient further potential extension of actuator 64 to ensure that the tension in roller chain 88 will diminish, permitting rocker arm 86 to pivot. If lumber stacker 24 is caused to index, or position, consecutive courses of lumber such that the top 26a is at a distance B below the bottom of plural stops 92 in their raised positions, then sticker placer 20 will operate within desirable tolerances, providing accurate placement of plural, consecutive stickers at various positions along what may be an unlevel or nonplanar course of lumber 26.

In the preferred embodiment, dimension A is approximately 0.356 m (one foot, two inches) and dimension B is approximately 0.305 m (one foot), as 5 cm (two inches) has been found to provide sufficient dwell time and slack to permit rocker arm 86 to pivot, without disturbing a sticker being supported thereby, and to accommodate a typical range of heights in the top 26a of lumber course 26, at various positions therealong.

Referring collectively to FIGS. 5 and 6, the detailed operation of support arm 58, pincer arm 60 and rocker arm 86 is illustrated, generally during the period of dwell time provided by the novel slider link mechanism of the invention. Brief reference to both reveals that FIG. 5 shows capture mechanism 54 at the moment when stop 92 reaches top 26a of the lumber course; FIG. 6 shows the same a moment later, as the tension in rocker arm spring 90 overcomes the reduced tension in roller chain 88 to pivot rocker arm 86 into its sticker release position, and as actuator 64 (not shown) fully extends to slacken roller chain 88.

FIG. 5 shows pincer arm 60 pivotally urged by coil spring 96 into downward impingement on sticker 56 shortly after stop 92 has reached top 26a of the lumber course. It will be appreciated that coil spring 96 must be under tension still, while pincer arm 60 is in the capture position shown in FIG. 5, in order to provide the continued pivoting of pincer arm 60, after at least one of plural stops 92 engages top 26a of the lumber course and rocker arm 86 pivots support arm 58 out from under sticker 56. This continuous downward urging by pincer arm 60 of sticker-being-placed 56, through both the downstroke and the dwell time of the placement cycle, ensures the repeatably accurate placement of stickers atop the course of lumber.

It will be appreciated that even while support arm 58 downward impingement on upper face 56b of sticker 56 by pincer arm 60 prevents sticker 56 from catching the slightly concave surface 58a of support arm 58, pivoting with it, and tumbling—perhaps onto an edge, rather than onto lower face 56b—onto the top 26a of the course of lumber. Instead, with the downward urging of sticker 56 as support arm 58 is pivoted, and with the engagement of the rear edge of sticker 56 by the front surfaces of stops 92, sticker 56 smoothly slides by its lower corners along concave surface 58a, its flat orientation thereby maintained and its precise placement thereby assured. While, in the preferred embodiment, fixed position stops 92 accommodate an approximately ±15% range of sticker widths, it also will be appreciated that one or more stops 92 may be equipped with longitudinally variable positioning means, e.g. a securable, slotted hole slide having a front surface for adjustably engaging the rear edge of sticker 56, that accommodates a wider range of predetermined nominal sticker widths.

Referring still to FIGS. 5 and 6, it will be understood that roller chain 88, which is attached to rocker arm 86 by a chain attach strut 120, initially is in a reduced tension condition yet is positioned behind (in FIG. 5, to the left of) central axis 84a of shaft 84. The reduced tension condition of roller chain 88 permits spring 90, which still is under tension, to overcome the tension in roller chain 88 and pivot rocker arm 86 into a second, sticker release position shown in FIG. 6. The pivoting of rocker arm 86 urges support arm 58 out from under sticker-being-placed 56 and, as shown in FIG. 6, positions chain attach strut 120 in front of (in FIG. 6, to the right of) central axis 84a of shaft 84. Roller chain 88 slackens, as shown in FIG. 6, as actuator 64 is further extended to the maximum reach of drive cylinder 62. As actuator 64 next is retracted by common drive cylinder 62, the slack in roller chain 88 will be taken up, and roller chain 88 once again will be under tension. Further retraction of actuator 64 will result in the raising of placement arm 36 by way of roller chain 88 through the upstroke cycle.

Turning finally to FIG. 7, a fragmentary, side elevation shows the detailed structure and operation of pinch bar 48 and pincer arm 60. Pincer arm 60 is shown in its open position, in which sticker-being-placed 56 has been allowed to slide onto support arm 58 from mouth 44 of pocket 34. Pincer arm 60, normally urged by coil spring 96 into impingement upon upper face 56b of sticker 56, has been pivoted, into its open position against shaft 84, by pincer arm trip 122, which is rigidly mounted to and depends from, stationary, transverse, support member 124, which extends laterally, as shown fragmentarily in FIG. 3, between working beam 22a and support beam 104.

FIG. 7 shows generally T-shaped pinch arm 48 in its open position in which a hooked end 48a is pivotally retracted to a position generally in the plane described by the lower edges of upper rails 40. Pinch bar 48 is lifted into its retracted position, at or near the upstroke of placement arm 36, by the engagement of pinch bar-mounted, adjustable bolt assembly 48b with transverse support member 76. Otherwise, and generally throughout the placement cycle, pinch bar 48 is urged pivotally by coil spring 100 into its impingement position upon the upper face 50b of to-be-placed sticker 50.

As may be seen, spring 100 is attached between a straight end 48c of pinch arm 48 and a rearwardly and laterally inwardly extending portion 122a of trip 122. By the adjustment of bolt assembly 48b, the arc subtended by hooked end 48a of pinch bar 48 optimally may be fixed so as not undesirably to constrict mouth 44 when retracted, while otherwise impinging effectively upon even the thinnest to-be-placed sticker 50. Support member 124 provides a stop for end 48c beyond which pinch bar 48 cannot further pivot, thereby establishing a minimum thickness for to-be-placed sticker 50 and accommodating an empty feed pocket 34. In the preferred embodiment of the invention, bolt assembly 48b provides a range of adjustment that accommodates a nearly 2 to 1 variation in sticker thickness, i.e. stickers that are barely one half of a predefined nominal maximum thickness reliably may be retaind within feed pocket 34.

Finally, it will be noted by reference to FIG. 7 that dual, longitudinally extending pocket support bars 126 connect adjacent feed pockets such as pocket 34 and provide added rigidity to frame-mounted sticker placer 20.

It will be understood that, as to-be-placed sticker 50 exits mouth 44 of pocket 34 and assumes the position of sticker-being-placed 56, upstream sticker 52 is permitted to slide down rail 42 toward mouth 44. Sticker 52 is prevented from exiting mouth 44 by its edge-lengthwise abutment with sticker 50, which assumes the position of sticker-being-placed 56, resting in the crook of sticker support arm 58. Even if there is a relatively wide variation in the longer, cross-sectional dimension of stickers within pocket 34, the hooked end 48a of pinch bar 48 will be urged, as placement arm 36 descends, into impingement upon upper face 50b of to-be-placed sticker 50, preferably approximately in the center thereof. This face impingement, as opposed to the edge impingement of conventional apparatus, has been found to provide reliable retention of upstream stickers, despite the dimensional variations and irregularities thereof. Thus, the apparatus of the invention takes advantage of the fact that the edges of stickers generally suffer more extensive damage from handling than do the faces of stickers.

The advantages offered by the invention should be apparent to those skilled in the art. By the use of inclined sticker pockets extending between a continuous, horizontal conveyor and a vertically reciprocable placement arm, stickers are required to traverse a path having successive turns of only approximately 45°, and are required to rotate on their central axes through an angle of only approximately 45°, thereby reducing the probability of a sticker's becoming disoriented or jammed during traversal of a more abrupt, 90° turn or rotation. By the handling of stickers always by opposite faces, rather than by one or more edges, the apparatus of the present invention is more tolerant of over-sized, under-sized and otherwise irregular stickers. By the positive capture of stickers between a lower, cradling support arm and an upper, downwardly impinging pincer throughout the placement cycle, sticker placement is rendered a highly controllable process, thereby enabling unprecedented accuracy and throughput.

By the use of a single, common drive cylinder and multiple slider links, the proposed sticker placer provides multi-position sticker placement along an unlevel or nonplanar course of lumber, thereby allowing each placement arm to 'seek' the level of the lumber corresponding to its position. Using spring biased, pivotable rocker, support and pincer arms, the invention achieves the critical timing needed to release each sticker precisely at the level of the lumber course. Providing a pocket lockout mechanism that, in cooperation with the slider link mechanism, permits selective disassociation of a placement arm from the common drive cylinder, the apparatus enables any combination of positions selectively to be operated.

Finally, by providing each feed pocket with feed gate pairs that selectively may be opened and closed to deflect stickers from a horizontal conveyor into the feed pocket, fully automatic operation of the sticker placer apparatus, in conjunction with conventional lumber stacking equipment, may be achieved.

It will be appreciated by those skilled in the art that many modifications may be made to the preferred embodiment without departing from the claimed subject matter of the invention. For example, drive cylinder 62 may be hydraulic instead of pneumatic, or may be replaced with a solenoid or other reciprocable drive means. Similarly, roller chain 88 may be replaced by a link chain, cable or other variable tension link means. Obviously, within the spirit of the invention, coil springs 90, 94, 96 may be replaced by other tensioning, or force imparting, means such as resilient cords, solenoids or drive cylinders.

Accordingly, while a preferred embodiment of the invention has been described herein, it is appreciated that further modifications are possible that come within the scope of the invention.

It is claimed and desired to secure by Letters Patent:

1. Apparatus for the controllable placement of a sticker on the top of a course of lumber comprising:

releasable sticker-face capture means including at least one pivotable support arm for supporting a face of the sticker, and releasable sticker retaining means operable with said support arm positively to capture the sticker by pressing against an opposite face thereof, thereby pinching the sticker;

generally vertically reciprocable carriage means mounting the capture means operable alternately to lower the capture means to the top of the lumber course and to raise the capture means therefrom, the carriage means including lost motion means providing a predefined dwell time after the lowering and before the raising of the carriage means; and sticker release means operable during the dwell time to pivot the support arm out from under the sticker, thereby releasing the sticker substantially at the level of the lumber course.

2. The apparatus of claim 1, wherein the retaining means tensionably impinge upon the top of the sticker, thereby urging the sticker downwardly through the controlled descent and the dwell time.

3. The apparatus of claim 1, wherein the sticker release means is operable by spring tension.

4. The apparatus of claim 1, wherein the capture means further includes a rocker arm pivotable with the support arm, the rocker arm under spring tension normally urging the support arm into generally horizontally position under the sticker.

5. The apparatus of claim 1, wherein the lost motion means includes stop means mounted on the carriage means for engagement with the top of the course of lumber, the stop means, upon such engagement, being operable to halt the descent of the capture means and to enable the operation of the sticker release means.

6. In apparatus for the placement of a sticker on the top of a course of lumber, the improvement comprising:

sticker-face capture means for positively capturing the sticker throughout the placement thereof, and a mounting for the capture means whereby it is shiftable between a raised position and a lowered position adjacent the level of the top of a course of lumbar the capture means including at least one pivotable support arm for supporting transversely thereabove a first face of the sticker, and at least one corresponding sticker retainer capable of impinging upon an opposite face of the sticker to urge the sticker downwardly into captured engagement with the support arm such capture means further including means for pivoting the support arm to a position freeing the sticker and for urging the retainer to force the sticker downwardly with the capture means in its lowered position.

7. The improvement of claim 6, wherein the sticker retainer is pivotally mounted and the capture means includes a spring biasing pivotal movement of the retainer to urge the sticker downwardly.

8. An apparatus for the placement of stickers having opposite faces on the top of a course of lumber, the apparatus having at least one placement station, each station having vertically shiftable placement means with a raised position for receiving consecutive stickers of a predetermined nominal thickness and a lowered position for placing the stockers in a predetermined generally horizontal position on the top of the course of lumber, the improvement comprising:

feeding means for feeding consecutive stickers to said placement means with the placement means in its raised position the feeding means including an inclined sticker pocket with an upper inlet end and a lower outlet end, the pocket having a plural sticker capacity and said outlet end being adjacent said placement means with the placement means in its raised position, the pocket having an inclined lower portion capable of slidably receiving thereagainst stickers disposed generally lengthwise horizontally with one face of the stickers slidably engaging the lower portion, the pocket having an upper portion portion disposed in generally parallel, spaced apart relationship to the lower portion at a distance substantially greater than the predetermined nominal thickness of the stickers, the feeding means further including releasable sticker retention means at said outlet end released with the placement means in its raised position and operable with the placement means out of its raised position to retain upstream stickers within the pocket and operable to release a sticker for placement within the placement means with the placement means in its raised position.

9. The improvement of claim 8, wherein the releasable sticker retention means includes a pivotable pinch bar that is capable of being urged by spring tension into impingement with the opposite face of the to-be-placed sticker.

10. The improvement of claim 8, wherein the sticker pocket is inclined at an angle of substantially less than 90° relative to the conveyor means.

11. The improvement of claim 11, wherein the sticker pocket is inclined at an angle of between 30° and 60° relative to the conveyor means.

12. The improvement of claim 11, wherein the sticker pocket is inclined at an angle of approximately 45° relative to the conveyor means.

13. In apparatus for the placement of stickers on the top of a course of lumber, the apparatus having at least one placement station, each station being capable of placing consecutive stickers in a predetermined generally horizontal position relative to the course of lumber, improved placement means comprising:

capturing means for releasably positively capturing each sticker throughout the placement of the sticker;

means for generally vertically reciprocating the capturing means; and means for releasing the capturing means by spring tension to deposit the sticker in the predetermined position.

14. In apparatus for the placement of plural stickers at predetermined positions along the tops of consecutive lumber courses, the apparatus having means at each of the predetermined positions for the controllable placement of consecutive stickers corresponding to consecutive lumber courses, the apparatus further having single drive means operable simultaneously to operate the placement means at each predetermined position, the improvement comprising:

extendable and retractable slider link means, coupled to each of the placement means, for moving each placement means through a plurality of placement cycles wherein each placement cycle includes extending each placement means to a predetermined position and retracting each therefrom.

15. The improvement of claim 14, wherein the placement means at each predetermined position includes a generally vertically reciprocable carriage for displacing one sticker at a time from a first location to the top of the course of lumber, further comprising carriage mounted stop means for halting the descent of the carriage when the top of the course of lumber is reached thereby.

16. Apparatus for the consecutive placement of stickers atop consecutive courses of lumber, comprising:

means for receiving stickers;

means for displacing one sticker at a time from the receiving means to the top of consecutive courses of lumber, including a trip mechanism and a generally vertically reciprocable carriage having dual laterally spaced apart releasable positive sticker capture means for releasably capturing one sticker at a time, the capture means including a generally horizontal pivotable sticker support arm, the carriage further having at least a pair of laterally spaced apart stops for engaging a top of consecutive courses of lumber, the displacing means further including means for alternately extending and retracting a slider link eccentrically attached to a pivotably carriage-mounted rocker arm, the rocker arm being pivotable with the support arm and being urged, during the extending of the slider link and until the stops engage the top of consecutive course of lumber, by slider link tension into a first sticker supporting position and being urged, during the further extending and the retracting of the slider link and until the rocker arm engages the trip mechanism, by spring tension into a second sticker release position.

17. The apparatus of claim 16, wherein the capture means further includes dual laterally spaced apart releasable sticker retainers capable of impinging upon the upper surface of the sticker generally opposite a corresponding sticker support arm to urge the sticker downwardly into captured engagement with the support arm until the rocker arm is urged into the second sticker release position and thereafter to urge the sticker downwardly onto the top of the course of lumber.

18. The apparatus of claim 16, wherein the extending-retracting means includes generally horizontally reciprocable drive means laterally offset from the carriage means, and wherein the slider link extends engagingly semicircumferentially along a lockably rotatable toothed sprocket, the sprocket being selectively lockable to prevent reciprocation of the carriage in response to the extending and retracting of the extending-retracting means.

19. The apparatus of claim 16 having conveyor means for conveying stickers to the sticker receiving means and in which the stickers are of a predetermined nominal thickness, wherein the sticker receiving means includes an inclined sticker pocket having a plural sticker capacity and extending between the conveyor means and the displacing means, the pocket being capable of slidably receiving against a lower portion thereof stickers disposed generally lengthwise horizontally with one face slidably engaging the lower portion, the pocket having an upper portion disposed in generally parallel, spaced apart relationship to the lower portion at a distance substantially greater than the predetermined nominal thickness of the stickers, the feeding means further including releasable sticker retention means operable with the displacement means to retain upstream stickers within the pocket and release the to-be-placed sticker for placement.

20. Apparatus for the placement of plural stickers at predetermined positions along the tops of consecutive lumber courses, comprising:

placement means at each of plural predetermined positions along the course of lumber for placing one sticker at a time in a corresponding position on top of consecutive courses of lumber, the placement means including a trip mechanism, a generally vertically reciprocable carriage having means for releasably positively capturing one sticker at a time, the capturing means including a generally horizontal pivotable sticker support arm, the carriage further having plural stops for engaging the tops of consecutive courses of lumber, each placement means further including means for alternately extending and retracting a slider link eccentrically attached at a distal end thereof to a pivotably carriage mounted rocker arm, the rocker arm being pivotable with the support arm and being urged, during the extending of the slider link and until at least one of the stops engages the top of consecutive courses of lumber, by slider link tension into a first sticker supporting position and being urged, during the further extending and the retracting of the slider link and until the rocker arm engages the trip mechanism, by spring tension into a second sticker release position;

single common drive means capable of operating simultaneously the placement means at each predetermined position;

means for feeding consecutive stickers to the placement means at each predetermined position;

means for indexing through consecutive lumber and means operably disassociation the placement means at at least one predetermined position from the drive means for selectively preventing the operation of the disassociated placement means.

21. Apparatus for placing a sticker on the top of a course of lumber comprising:

a pocket for holding a series of stickers with the stickers disposed as a layer of stickers disposed edge-to-edge and the pocket having an outlet end where the terminal sticker in said layer is fed from the pocket, capture means for capturing a terminal sticker at said outlet end of the pocket and a mounting for said capture means whereby it is shiftable between a raised position located adjacent said outlet end and a lowered position located adjacent the top of the course of lumber, said capture means including a support arm which engages a surface of the sticker which extends on one side of the sticker normal to its edges, and a retainer which engages a surface of the sticker which extends on the opposite side of the sticker, said support arm being movably mounted on said mounting for movement away from the surface of the sticker that is engages to a release position for the support arm, said capture means further including producing movement of said support arm to its said release position with the capture means in its said lowered position.

* * * * *